(No Model.) 2 Sheets—Sheet 2.
D. C. MAYO.
TOBACCO STEM DRIER.
No. 588,459. Patented Aug. 17, 1897.
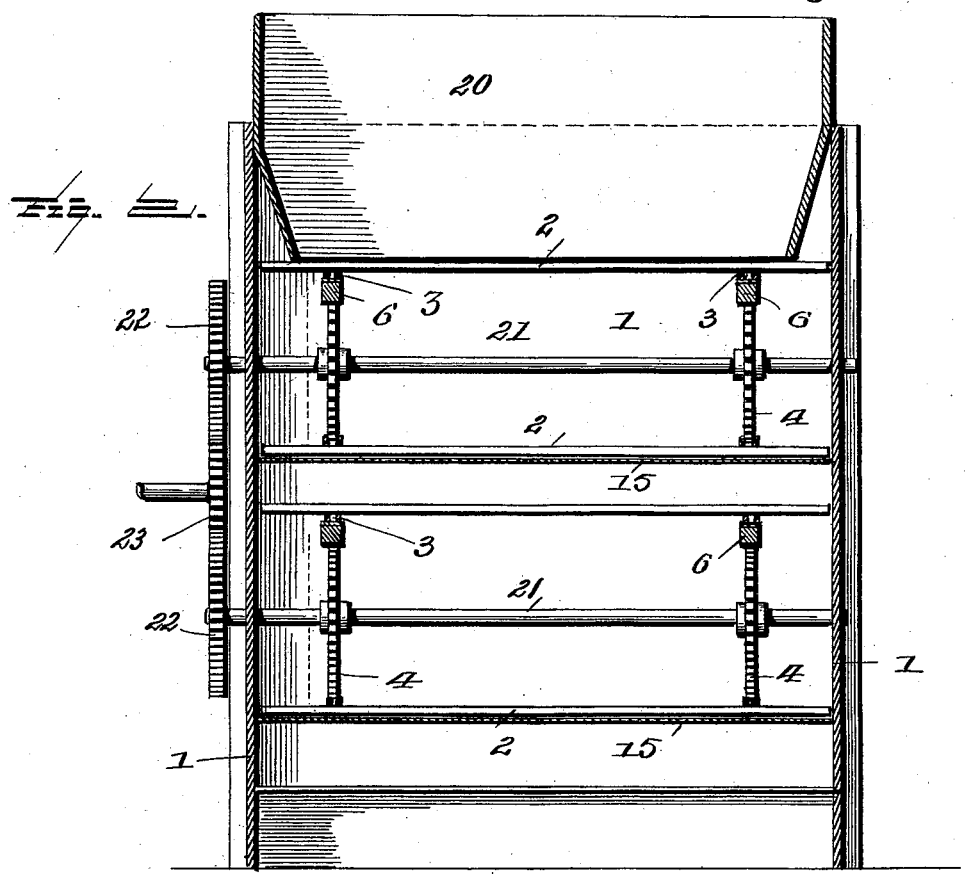
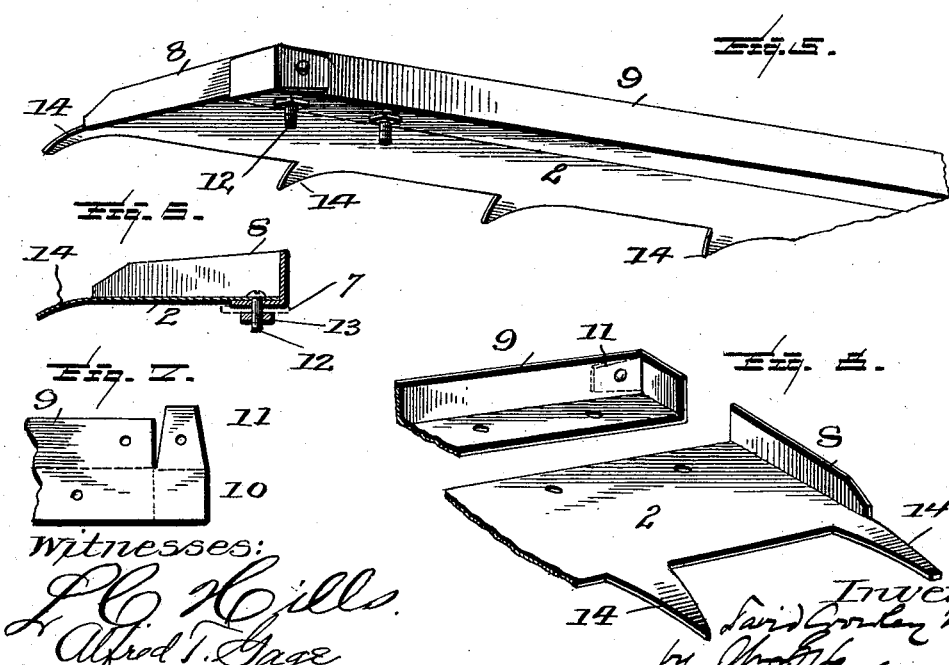
Witnesses:
L. C. Hills.
Alfred T. Gage.
Inventor:
David Corley Mayo,
by his Attorney
THE NORRIS PETERS CO., PHOTO-LITHO., WASHINGTON, D. C.

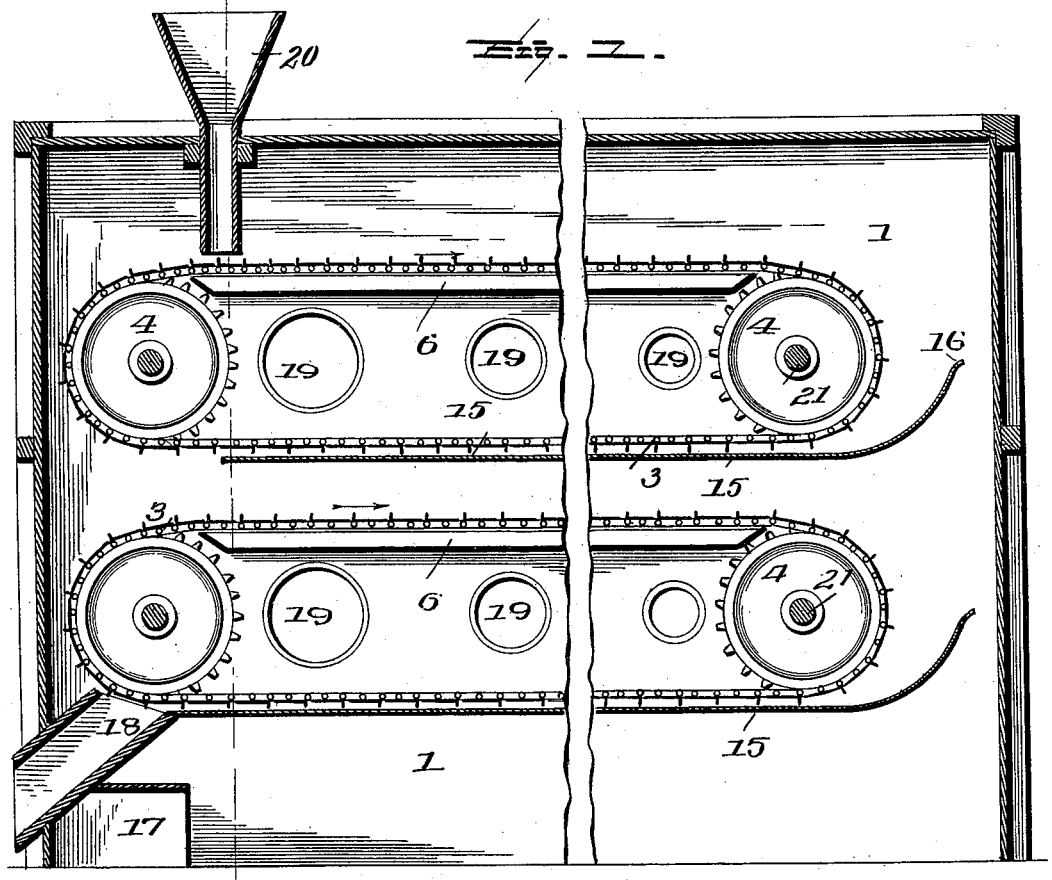

UNITED STATES PATENT OFFICE.

DAVID CROWLEY MAYO, OF RICHMOND, VIRGINIA.

TOBACCO-STEM DRIER.

SPECIFICATION forming part of Letters Patent No. 588,459, dated August 17, 1897.

Application filed October 19, 1896. Serial No. 609,348. (No model.)

*To all whom it may concern:*

Be it known that I, DAVID CROWLEY MAYO, a citizen of the United States, residing at Richmond, in the county of Henrico and State of Virginia, have invented certain new and useful Improvements in Tobacco-Stem Driers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to tobacco-stem driers, and has for its object the formation of a drier which will serve the purpose of drying the stems to the maximum extent in the minimum of time. It has also for its object to so construct and combine the conveying-pans that the possibility of the rear of one pan so binding against the front of the adjoining pan as to interfere with the easy working of the pan or do damage to the pans in passing from an arc of a circle to a straight line in making the turns at the ends of the endless carrier will be prevented. It has further for its object to provide an improved construction of pan which will be of minimum weight, thus reducing wear and tear and expense, and yet be of sufficient strength to prevent the rear flange of the pan being bent out of shape in the operation of the drier.

To the accomplishment of the foregoing and such other objects as may hereinafter appear the invention consists in the construction and in the combination of parts hereinafter particularly described, and then sought to be specifically defined by the claims, reference being had to the accompanying drawings, forming a part hereof, in which—

Figure 1 is a vertical section through a drier embodying my invention. Fig. 2 is a vertical cross-section through the same. Fig. 3 is a vertical longitudinal section through the endless conveyer. Fig. 4 is a plan view of a portion of the conveyer, showing several of the pans with portions thereof broken away. Fig. 5 is a perspective of one of the conveyer-pans, looking at it from the rear. Fig. 6 is a vertical section through the same. Fig. 7 is a plan of a portion of the blank from which is formed the rear portion of the pan; and Fig. 8 is a perspective of a portion of the rear and forward parts of the pan, the two parts being separated.

In the drawings the numeral 1 designates a close case or shell of any suitable form and dimensions to form a close chamber which will contain the conveyers and to which hot air will be admitted to dry the tobacco-stems as they are carried back and forth through the chamber. This chamber may contain any desired number of conveyers for moving the material back and forth through it under the influence of hot air, but for purposes of illustration I have shown two conveyers, one above the other.

Each conveyer consists of an endless belt or carrier made up a series of pans 2 and sprocket-chains 3, to which the pans are attached, there being a sprocket-chain for each set of sprocket-wheels 4, and the pans extended from one sprocket-chain to the other, so as to cover the space between the two chains. The sprocket-chains are preferably of the form shown, being provided with rollers 4 at the junction of the several links of the chain, which rollers will rest upon and travel over rails 6, placed beneath the upper portion of the endless carrier, as indicated clearly in Figs. 1 and 2 of the drawings. The pans are secured to the sprocket-chains by bolts passing through the pans and into ears 7, which project from the sprocket-chains.

Each pan is formed with side flanges 8, which prevent the tobacco-stems from working down between the sides of the pans and the side walls of the chamber in which the conveyers are arranged, and is also formed with a rear flange 9, which serves to draw the tobacco-stems along in the movement of the conveyer, especially in moving the stems from the rear toward the front of the conveyer, as the pans traverse the floor which lies beneath each conveyer, the edge of each flange lying sufficiently near to the floor for the purpose when the pans are inverted and traversing from the rear to the front of the floor. It is desirable to have each one of these pans made as light as possible consistent with strength, so that the weight of the endless conveyer will be as little as possible, and yet the flanges, and especially the rear flanges, should be heavy enough not to be bent out of shape by the weight of the stems against which the flanges will exert a drawing or pulling action. To accomplish this end, I form the bottom and the side flanges of each pan of comparatively light sheet metal, and the rear portion of the pan is made of heavier metal. The preferred construction for this purpose is illustrated clearly in Figs. 5 and 8 of the drawings, wherein the rear portion of the pan is illustrated as made from a blank 10 of comparatively heavy metal, which is bent up into the angular form illustrated in Fig. 8 and with the lip 11 bent around the back of the rear flange 9 and secured by a rivet thereto. The forward portion of the pan is formed as illustrated in Fig. 8 of the drawings and set within the angular portion constituting the rear part of the pan and secured thereto by bolts 12 and nuts 13, as illustrated in Fig. 6 of the drawings, the nuts and bolts serving also to secure the pans to the ears 7 on the sprocket-chains, as indicated in the same figure. In this way I obtain a pan of sufficient strength to serve the purpose and yet of comparatively light weight, both of which requisites have been found very desirable in a machine of this character. I have also found in the actual operation of a conveyer-belt formed of pans that in turning around the sprocket-wheels and changing from the arc of a circle to a plane surface the adjacent edges of adjoining pans are liable to be thrown out of proper position, and thus cause one edge to so contact with the other as to make the parts bind, and thus interfere with the easy and proper working of the pans. With the view of overcoming that difficulty I form the front edge of each pan with fingers 14, which will lap under the adjoining pan, as illustrated clearly in Fig. 3 of the drawings, thus serving as guides for the pans as they pass around the sprocket-wheels and causing the pans to come into proper position in relation to one another after passing around the sprocket-wheels, so as not to bind one against the other. These fingers, while performing the function just described, will at the same time permit the hot air to pass from inside the endless conveyer into the chamber inclosing the conveyer at the meeting edges of the adjacent pans as they turn around the sprocket-wheels. At these points the joints between the meeting edges of the pans are opened up by the edge of one pan leaving the edge of the adjoining pan in making the arc described by the sprocket-wheel, as indicated clearly in Fig. 3 of the drawings, and as the fingers occupy only a portion of the space between the pans, thus leaving open spaces between the fingers, the hot air will pass through the spaces.

Beneath each endless conveyer is placed a platform or floor 15, which preferably is made of metal and which will extend from one side wall to the other of the casing or shell. These floors or platforms will at one end extend beyond the sprocket-wheels 4, so as to receive the tobacco-stems as they fall from the conveyer-pans in passing around the sprocket-wheels at that end, and they will terminate back from the end wall of the case or shell, so as to leave spaces 16 at those ends for the passage of the hot air down into the bottom of the case or shell and thence out through the opening 17. The forward end of the floor or platform directly beneath the top conveyer terminates at a point back from the forward end of the conveyer next below, so that the tobacco-stems which are moved by the flanges of the pans along the floor or platform will be discharged onto the top of the conveyer next below, as indicated clearly in Fig. 1, and the forward end of the floor or platform to the bottom conveyer will discharge into a spout 18, which will carry the dried tobacco-stems from the machine.

Hot air is admitted, from any suitable source, through openings 19 into the space inclosed by each one of the endless conveyers. This causes the tobacco-stems to be subjected to the influence of hot air from the space inside the conveyer at both the top and the bottom of the conveyer as the stems are carried back and forth. The stems are also subjected to the influence of the hot air outside of the conveyers or in the chamber in which the conveyers are inclosed, the hot air being supplied to the chamber through the spaces between the adjoining pans made as they turn around the sprocket-wheels. The hot air admitted into the chamber at these points passes through the stems as they fall from the upper portion of the conveyers down onto the platform.

The tobacco-stems are fed to the top conveyer through the hopper 20, which fits loosely in an opening formed in the top of the case or shell 1, so that it can be raised or lowered to bring its discharge end nearer to or farther from the conveyer for the purpose of regulating the amount of stems fed to the conveyer, the hopper being supported in its adjusted position by any suitable means.

Motion is transmitted to the shafts 21 of the sprocket-wheels by gears 22 and 23 or any other suitable system of gearing, which may be formed in any well-known way that will enable the speed to be varied at will, but the details of which are not shown, as the same does not involve invention and is left to the judgment of the mechanic.

In operation, assuming that the conveyers are moving and that hot air is admitted to the space inclosed by each conveyer, the tobacco-stems are fed from the hopper 20 in the desired quantity onto the top of the upper conveyer, each pan receiving a portion of the stems as the conveyer travels along. As the pans reach and turn around the sprocket-wheels farthest removed from the receiving end of the conveyer the stems are discharged from the pans down onto the floor or platform 16, and while falling hot air passes through the mass of stems as it issues from the space inclosed by the conveyer. The stems which have been discharged onto the platform are engaged by the rear flanges of the pans as these pans move around the sprocket-wheels, and the flanges serve to draw or pull the stems along over the floor or platform to the opposite end thereof, from which they fall onto the conveyer next below, where the operation is the same as in the top conveyer, and so on throughout the entire number of conveyers employed. The stems are thus caused to traverse an extended distance in a comparatively small space and during the whole period are subjected to the drying influence of hot air operating from both inside the space inclosed by each conveyer and also in the chamber surrounding the conveyers, whereby the stems are thoroughly dried in a comparatively short time and discharged from the machine in excellent condition for utilization. The pans lie close together, so as to present practically a surface with no intervening spaces between the pans for the stems to fall through while the pans travel in a horizontal direction, and when spaces are formed between the pans as they pass around the sprocket-wheels said spaces are bridged by the fingers formed on the pans, so that the pans will be caused to assume their proper position again after passing around the wheels without binding one against the other in a way that would interfere with the proper working of the conveyer.

I have illustrated and described what I deem to be the preferred details of construction of the several parts; but it is obvious that changes can be made and the essential parts of my invention still be retained.

Having described my invention and set forth its merits, what I claim is—

1. A tobacco-stem drier consisting of a case or shell, a series of conveyers therein, each conveyer composed of a series of pans arranged to form an endless belt, the adjacent edges of the pans lying close together to prevent the stems from dropping between the pans and each pan provided at its rear with a flange of greater rigidity than the base of the pan, a floor or platform beneath each conveyer and arranged so that the stems will be discharged therefrom onto the conveyer next below, and adapted to have the stems drawn over it by the rear flanges to the pans, and means for introducing hot air into the space inclosed by each conveyer, substantially as and for the purposes described.

2. In a tobacco-stem drier, the combination with a case or shell, of a conveyer composed of a series of pans arranged to form an endless belt, each pan being formed in two parts, the rear part being of angular form with an upwardly-extending rear flange of heavier material than the other part, the front part lapping upon and being secured to the horizontal portion of the rear part, and a platform lying beneath the conveyer and having one end extended beyond the conveyer to receive the stems as discharged from the pan, and adapted to have the stems drawn over it by the rear flanges to the pans, substantially as and for the purposes described.

3. In a tobacco-stem drier, the combination with a case or shell, of a conveyer composed of a series of pans arranged to form an endless belt, each pan being provided with fingers extending under the next adjoining pan, substantially as and for the purposes described.

4. A tobacco-stem drier consisting of the case or shell, a series of conveyers therein, each conveyer composed of a series of pans arranged to form an endless belt, each pan provided at its rear with an upwardly-extending flange and formed with fingers projecting under the next adjoining pan, a floor or platform beneath each conveyer extended at one end to receive the stems discharged from the top of the conveyer and arranged to deliver the stems onto the conveyer next below, and means for admitting hot air into the space inclosed by each conveyer, substantially as and for the purposes described.

In testimony whereof I affix my signature in presence of two witnesses.

DAVID CROWLEY MAYO.

Witnesses:
  WM. R. BONN,
  E. M. CRUTCHFIELD.